United States Patent
Kenney et al.

(10) Patent No.: US 9,654,269 B2
(45) Date of Patent: May 16, 2017

(54) METHODS AND ARRANGEMENTS FOR AN ACKNOWLEDGEMENT IN WIRELESS NETWORKS

(75) Inventors: Thomas J. Kenney, Portland, OR (US); Eldad Perahia, Portland, OR (US); Minyoung Park, Portland, OR (US); Emily H. Qi, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 33 days.

(21) Appl. No.: 13/977,702

(22) PCT Filed: Dec. 30, 2011

(86) PCT No.: PCT/US2011/068257
§ 371 (c)(1),
(2), (4) Date: Mar. 19, 2014

(87) PCT Pub. No.: WO2013/052075
PCT Pub. Date: Apr. 11, 2013

(65) Prior Publication Data
US 2014/0198739 A1    Jul. 17, 2014

Related U.S. Application Data

(60) Provisional application No. 61/544,857, filed on Oct. 7, 2011.

(51) Int. Cl.
*H04L 5/00* (2006.01)
*H04L 1/08* (2006.01)
*H04L 1/16* (2006.01)

(52) U.S. Cl.
CPC .......... *H04L 5/0055* (2013.01); *H04L 1/08* (2013.01); *H04L 1/1607* (2013.01); *H04L 5/0062* (2013.01)

(58) Field of Classification Search
None
See application file for complete search history.

(56) References Cited

U.S. PATENT DOCUMENTS 6,098,103 A * 8/2000 Dreyer .............. H04L 12/40013
709/234
8,335,283 B1 * 12/2012 Sun ........................ H04L 7/042
375/316

(Continued)

FOREIGN PATENT DOCUMENTS

WO    2013/052075 A1    4/2013

OTHER PUBLICATIONS

International Preliminary Report on Patentability and Written Opinion received for PCT Patent Application No. PCT/US2011/068257 mailed on Apr. 17, 2014, 6 Pages.

(Continued)

*Primary Examiner* — Jae Y Lee
*Assistant Examiner* — Tito Pham
(74) *Attorney, Agent, or Firm* — Schubert Law Group PLLC (57) ABSTRACT

Embodiments may comprise physical layer logic to implement a new, short acknowledgement. Embodiments may store the short acknowledgement on a machine-accessible medium. Some embodiments may determine and transmit a communication with the short acknowledgement. Further embodiments may receive and detect communications with the short acknowledgement. The short acknowledgement may reduce power consumption and reduce on-the-air time.

25 Claims, 6 Drawing Sheets

| SHORT ACK |
|---|
| 1100 | STF 1104 | STF 1106 | STF 1108 | STF 1110 | STF 1112 | STF 1114 | STF 1116 | STF 1118 | STF 1120 | STF 1122 |

(56) References Cited

U.S. PATENT DOCUMENTS

| | | | |
|---|---|---|---|
| 2003/0177267 A1* | 9/2003 | Orava | H04L 29/12264 709/245 |
| 2004/0170197 A1* | 9/2004 | Mehta | H04L 27/2675 370/504 |
| 2006/0136614 A1 | 6/2006 | Kakani et al. | |
| 2007/0041334 A1* | 2/2007 | Song | H04W 74/0808 370/254 |
| 2009/0323697 A1 | 12/2009 | Celentano et al. | |
| 2010/0002811 A1 | 1/2010 | Razazian et al. | |
| 2011/0286469 A1* | 11/2011 | Yasuda | H04L 1/188 370/412 |
| 2013/0128807 A1* | 5/2013 | Vermani | H04L 5/0053 370/328 |
| 2013/0142176 A1* | 6/2013 | Wentink | H04W 28/065 370/336 |
| 2013/0170523 A1* | 7/2013 | Vermani | H04L 27/2602 375/141 |

OTHER PUBLICATIONS

International Search Report and Written opinion received for PCT Patent Application No. PCT/US2011/068257, mailed on Oct. 30, 2012, 9 Pages.

* cited by examiner

OVERLAY SEQUENCE 1060

| 1 | -1 | 1 | -1 | 1 | 1 | 1 | 1 | -1 |

FIG. 1B

OVERLAY SEQUENCE 1080

| 1 | -1 | -1 | 1 | 1 | -1 | 1 | -1 | -1 |

PARTIAL ASSOCIATION IDENTIFIER (00110100) 1082

FIG. 1C

SHORT ACK 1100

| STF 1104 | STF 1106 | STF 1108 | STF 1110 | STF 1112 | STF 1114 | STF 1116 | STF 1118 | STF 1120 | STF 1122 |

METHODS AND ARRANGEMENTS FOR AN ACKNOWLEDGEMENT IN WIRELESS NETWORKS

BACKGROUND

Embodiments are in the field of wireless communications. More particularly, embodiments are in the field of communications protocols between wireless transmitters and receivers related to acknowledgements of receipt of communications.

DETAILED DESCRIPTION OF EMBODIMENTS

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Embodiments may comprise physical layer logic to implement a new, short acknowledgement. The new, short acknowledgement may reduce power consumption and reduce time-on-air. Embodiments may store the short acknowledgement on a machine-accessible medium. Some embodiments may determine and transmit a communication with the short acknowledgement. Further embodiments may receive and detect communications with the short acknowledgement. Some embodiments may provide, e.g., indoor and/or outdoor "smart" grid and sensor services. For example, some embodiments may provide sensors to meter the usage of electricity, water, gas, and/or other utilities for a home or homes within a particular area and wirelessly transmit the usage of these services to a meter substation. Further embodiments may utilize sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services generally require much lower data rates and much lower (ultra low) power consumption than devices provided in IEEE 802.11n/ac systems.

In some embodiments, the short acknowledgement packet may comprise a truncated packet. For instance, in some embodiments, the truncated packet may comprise a short training field (STF) with a ten symbol, short training sequence. In further embodiments, the truncated packet may comprise an STF and a long training field (LTF) with a two symbol, long training sequence. Many embodiments precede the LTF with a guard interval. In other embodiments, the truncated packet may comprise a preamble including an STF, an LTF, and a signal field (SIG), i.e., no data payload.

In many embodiments, the truncated packet may comprise a repeating pattern of symbols and may comprise at least one phase shift between symbols of the repeating pattern of symbols to identify the truncated packet as the short acknowledgement. For instance, the repeating pattern of symbols may comprise the ten symbols of the STF and/or the two symbols of the LTF. The phase shift may shift the signal that represents the phase-shifted symbol by, e.g., 180 degrees.

In several embodiments, the truncated packet may comprise multiple phase shifts defined by an overlay sequence. For example, an overlay sequence may comprise two symbols that are not phase-shifted followed by a pattern of phase shifts amongst, e.g., eight symbols of an STF. In some embodiments, the overlay sequence may comprise an alternating pattern of zero degree phase shifts and 180-degree phase shifts. In some embodiments, the overlay sequence may comprise an alternating pattern of 90-degree phase shifts and negative 90-degree phase shifts. In some embodiments, the overlay sequence may comprise an alternating pattern of negative 45-degree phase shifts and 135-degree phase shifts. In other embodiments, the overlay sequence may comprise an alternating pattern of more than two phase shifts. For example, some embodiments may implement four phase shifts such as an alternating pattern of zero degree phase shifts, 90-degree phase shifts, 180-degree phase shifts, and 270-degree phase shifts.

In further embodiments, the overlay sequence may comprise a pattern of phase shifts that represent an address of the receiver such as an association identification (AID). In several embodiments, the overlay sequence may comprise a pattern of phase shifts that represent a base service set (BSS) via, e.g., at least a portion of the BSS identifier (BSSID). In further embodiments, the overlay sequence may comprise a pattern of phase shifts that represent a medium access control (MAC) address for the receiving station (STA) via, e.g., at least a portion of the MAC address for the receiving station.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, Institute of Electrical and Electronic Engineers (IEEE) IEEE 802.11-2007, IEEE Standard for Information technology Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2007.pdf), communications in networks, messaging systems, and smart-devices to facilitate interaction between such devices. Furthermore, some wireless embodiments may incorporate a single antenna while other embodiments may employ multiple antennas. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Figure 1:
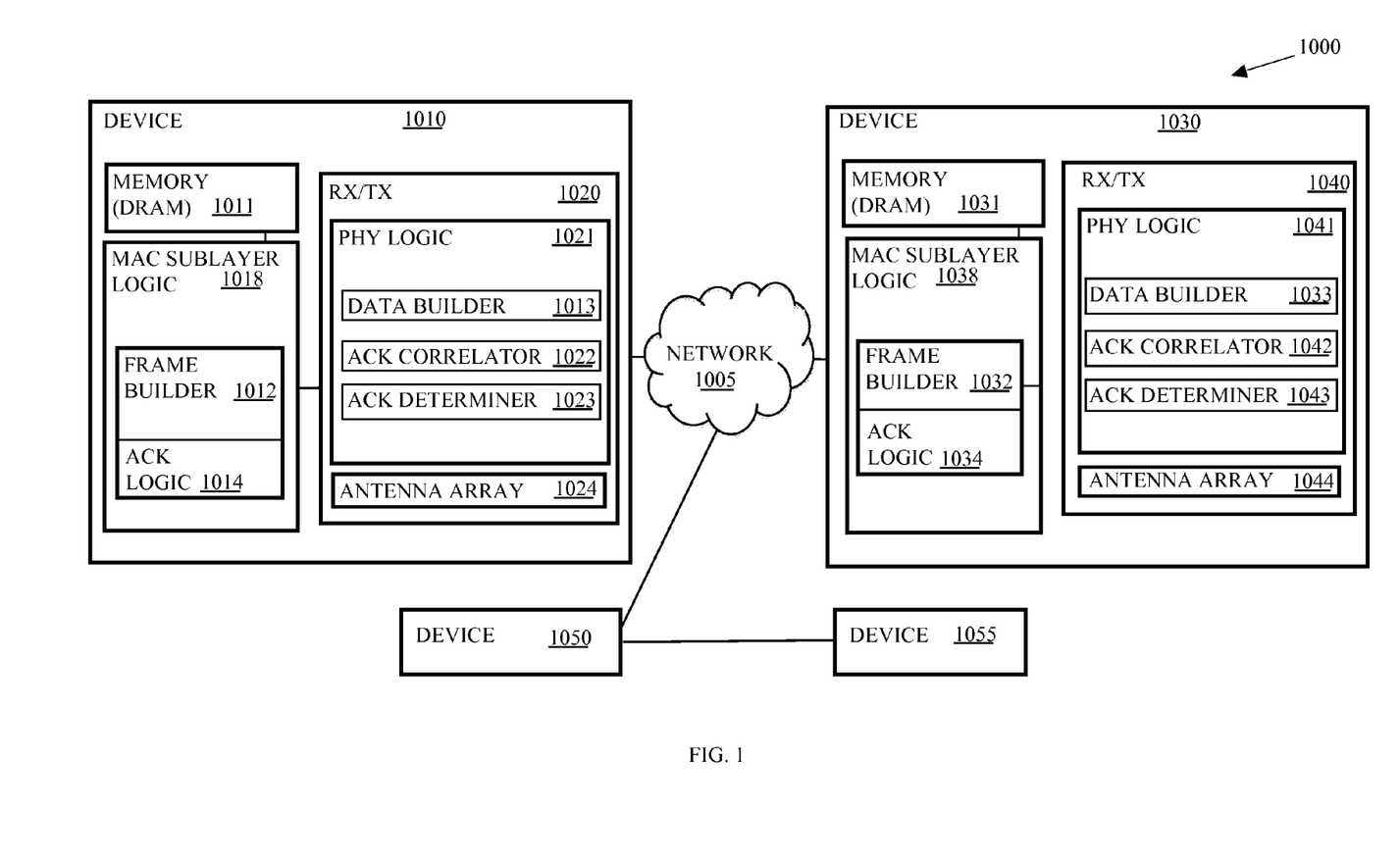
FIG. 1 depicts an embodiment of an example wireless network comprising a plurality of communications devices, including multiple fixed or mobile communications devices.

Turning now to FIG. 1, there is shown an embodiment of a wireless communication system 1000. The wireless communication system 1000 comprises a communications device 1010 that is wire line or wirelessly connected to a network 1005. The communications device 1010 may communicate wirelessly with a plurality of communication devices 1030, and 1050 via the network 1005. The communications devices 1010, 1030, and 1050, and 1055 may comprise a sensor, a station, an access point, a hub, a switch, a router, a computer, a laptop, a notebook, a cellular phone, a PDA (Personal Digital Assistant), or another wireless-capable device. Thus, communications devices may be mobile or fixed. For example, the communications device 1010 may comprise a metering substation for water consumption within a neighborhood of homes. Each of the homes within the neighborhood may comprise a communications device such as the communications device 1030 and the communications device 1030 may be integrated with or coupled to a water meter usage meter. Periodically, the communications device 1030 may initiate communications with the metering substation, communications device 1010, to transmit data related to water usage. The communications device 1010 may respond and the communications device 1030 may acknowledge the response with a short acknowledgement comprising, e.g., a preamble or a portion of the preamble such as a short training field. Furthermore, the metering station or other communications device may periodically initiate communications with the communications device 1030 to, e.g., update firmware of the communications device 1030 and the communications device 1030 may acknowledge the response with a short acknowledgement. In other embodiments, the communications device 1030 may only respond to communications and may not comprise logic that initiates communications.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, and 1050. Communications device 1050 may be a second metering substation for receiving data in an adjacent geographical area and transmitting the data to the communications device 1010. Communications device 1055 may be, e.g., a sensor communicatively coupled with the communications device 1050 and may be sufficiently near communications devices 1010 and 1030 to receive transmissions from communications devices 1010 and 1030.

The communication devices 1010 and 1030 comprise memory 1011 and 1031, and medium access control (MAC) sublayer logic 1018 and 1038, respectively. The memory 1011, 1031 such as Dynamic Random Access Memory (DRAM) may store the frames, preambles, and preamble structures, or portions thereof The frames, also referred to as MAC layer Protocol Data Units (MPDUs), and the preamble structures may establish and maintain synchronized communications between the transmitting device and the receiving device.

The MAC sublayer logic 1018, 1038 may generate the frames and the physical layer (PHY) logic 1041 may generate physical layer data units (PPDUs). More specifically, the frame builders 1012 and 1032 may generate frames and data unit builders 1013, 1033 may generate PPDUs with one or more MPDUs. In some embodiments, the MAC sublayer logic 1018, 1038 may also comprise acknowledgement logic 1014, 1034 to transmit an indication to physical layer logic 1021, 1041 to transmit a short acknowledgement. For instance, the communications device 1030 may be integrated with a sensor that makes measurements of the environment in the vicinity of the communications device 1030 and may transmit a packet including data related to the measurements to communications device 1010. In response, communications device 1010 may transmit a short acknowledgement to communications device 1030 indicating receipt of the packet of data.

In such embodiments, the acknowledgement logic 1014 may determine that a short acknowledgement may be transmitted to communications device 1030 (without generating an MSDU, an MPDU, and a PPDU). In particular, many embodiments transmit the STF only as the short acknowledgement so the MAC sublayer logic 1018 does not need to generate a data payload for the acknowledgement. In other embodiments, the frame builder 1012 of the MAC sublayer logic 1018 may encapsulate the MSDU to build an MPDU and transmit the MPDU to the data unit builder 1013 to indicate to the physical layer logic 1041 that the short acknowledgement may be transmitted. In still other embodiments, the data unit builder 1013 may generate the PPDU to transmit the short acknowledgement to the communications device 1030.

In many embodiments, the acknowledgement logic 1014, 1034 may transmit the indication to transmit the short acknowledgement to the physical layer logic 1021, 1041, bypassing the processes of encapsulating an MSDU to build an MPDU by the frame builder 1012, 1032 and building the PPDU by the data unit builder 1013, 1033. In other embodiments, the data unit builder 1013, 1033 may generate a preamble or a portion of a preamble to be transmitted by the transceiver (RX/TX) 1020, 1040. In such embodiments, each data unit builder 1013, 1033 may supply a preamble structure comprising a short training field (STF), a long training field (LTF), and a signal field and store the preambles generated based upon the preamble structure in the memory 1011, 1031 while the preambles are being generated and/or after the preambles are generated. In the present embodiment, the preamble structure for the short acknowledgement may comprise one short training field (STF). In further embodiments, the preamble structure for the short acknowledgement may comprise at least one STF and at least one long training field (LTF). In still other embodiments, the preamble structure for the short acknowledgement may also comprise a signal field.

The STF and the LTF may train the antenna arrays 1024 and 1044 to communicate with each other by making measurements related to communications such as measurements related to relative frequency, amplitude, and phase variations between quadrature signals. In particular, the STF may be used for packet detection, automatic gain control, and coarse frequency estimation. The LTF may be used for channel estimation, timing, and fine frequency estimation for a spatial channel.

The communications devices 1010, 1030, 1050, and 1055 may each comprise a transceiver (RX/TX) such as transceivers (RX/TX) 1020 and 1040. Each transceiver 1020, 1040 comprises an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom. FIG. 1 may depict a number of different embodiments including a multiple-input, multiple-output (MIMO) system with, e.g., four spatial streams, and may depict degenerate systems in which one or more of the communications devices 1010, 1030, 1050, and 1055 comprise a receiver and/or a transmitter with a single antenna including a single-input, single output (SISO) system, a single-input, multiple output (SIMO) system, and a multiple-input, single output (MISO) system.

The transceivers (RX/TX) 1020 and 1040 may comprise physical layer (PHY) logic 1021 and 1041, respectively. The PHY logic 1021, 1041 may comprise logic to select or generate a short acknowledgement for transmission as well as logic to receive and detect a short acknowledgement. In many embodiments, PHY logic 1021, 1041 may have an ACK correlator 1022, 1042 to detect the short acknowledgement via processing in the time-domain. The ACK correlator 1022, 1042 may store known short acknowledgements or known truncated packets in memory or hardcoded into or implemented in logic circuitry in the ACK correlator 1022, 1042. And the ACK correlator 1022, 1042 may compare the known short acknowledgements or known truncated packets with the received communication to determine if the received communication comprises a short acknowledgement. This approach works well with sensor networks where sensors are transmitting very infrequently. Thus, when a sensor is transmitting or receiving, it is very likely it is the only device doing so in its own base service set (BSS). The inclusion of phase-shifts in the short acknowledgement creates a more robust system, avoiding issues associated with interference with other devices in the same BSS or nearby devices in an adjacent BSS during transmission of the short acknowledgement.

The PHY logic 1021, 1041 may also comprise an acknowledgement (ACK) determiner 1023, 1043. The ACK determiner 1023, 1043 may determine a short acknowledgement to transmit to the receiving device in response to the indication to transmit a short acknowledgement from the MAC sublayer logic 1018, 1038. In some embodiments, the ACK determiner 1023, 1043 may select a truncated packet to transmit as the short acknowledgement. In such embodiments, the truncated packets may be stored in memory or hardcoded into or implemented in logic circuitry in the ACK determiner 1023, 1043.

In other embodiments, overlay sequences may be stored in memory or hardcoded into or implemented in logic circuitry in the ACK determiner 1023, 1043. In such embodiments, the ACK determiner 1023, 1043 may generate a truncated packet for the short acknowledgement by phase-shifting symbols of a preamble or portions of a preamble such as one or more STFs and/or LTFs. In several of these embodiments, the truncated packet without phase-shifts may be stored in memory or hardcoded into or implemented in logic circuitry in the ACK determiner 1023, 1043.

In still other embodiments, the ACK determiner 1023, 1043 may generate a truncated packet for the short acknowledgement by phase-shifting symbols of a preamble or portions of a preamble such as a preamble, or portion thereof, received from the data unit builder 1013, 1033; the frame builder 1012, 1032; or the ACK logic 1014, 1034.

In several embodiments, the short acknowledgement may comprise a truncated packet with a repeating pattern of symbols such as an STF overlaid with one or more phase shifts to identify the STF as being an acknowledgement of, e.g., receipt of the previous transmission. The phase shifts may comprise a pattern such as an alternating pattern of symbols that are phase-shifted and symbols that are not phase-shifted. The inclusion of two or more symbols that are not phase-shifted may provide a sufficiently consistent pattern in many embodiments to identify the STF.

Figure 1A:
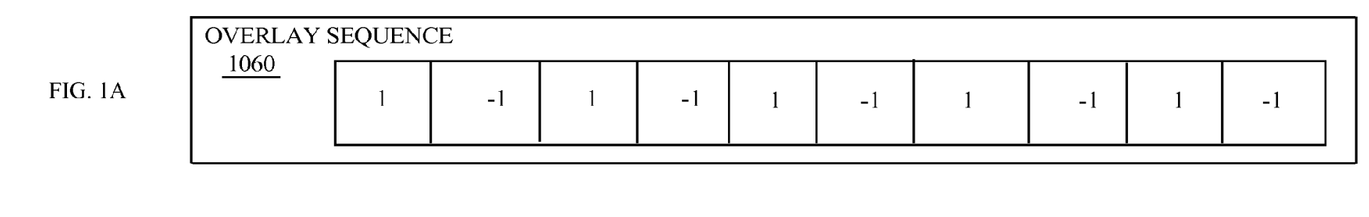
FIG. 1A depicts an embodiment of an overlay sequence to overlay a pattern of short training field symbols.

In some embodiments, the short acknowledgement may comprise a truncated packet comprising an STF having a pattern of phase-shifted symbols in accordance with an overlay sequence such as the receiver address (RA) field information. FIG. 1A illustrates an embodiment of an overlay sequence 1060 for the ten symbol STF illustrated in FIG. 1C. The "1" values denote no phase shift and the "−1" values denote a 180 degree phase shift. In accordance with the overlay sequence 1060, the short acknowledgement 1100 would comprise an STF 1104, a phase-shifted STF 1106, an STF 1108, a phase-shifted STF 1110, an STF 1112, a phase-shifted STF 1114, an STF 1116, a phase-shifted STF 1118, an STF 1120, and a phase-shifted STF 1122.

Other embodiments may employ different phase shifts in the symbols. For example, the overlay sequence may represent an alternating pattern of 90-degree phase shifts and negative 90-degree phase shifts or negative 45-degree phase shifts and 135-degree phase shifts. In further embodiments, the overlay sequence may comprise an alternating pattern of more than two-phase shifts. For example, some embodiments may implement four phase shifts such as an alternating pattern of zero degree phase shifts, 90-degree phase shifts, 180-degree phase shifts, and 270-degree phase shifts.

According to some embodiments, the selection of the overlay sequences may be based upon overlay codes (also referred to as overlay codewords) and may be orthogonal or nearly orthogonal so that a receiving device's ability to discern between ACK's in overlapping BSS's is improved. In many of these embodiments, since only a few overlay codes may be required, one overlay code set may be based on the Walsh-Hadamard code:

$$W = \begin{bmatrix} 1 & 1 \\ 1 & -1 \end{bmatrix} \text{ and } W_N = \begin{bmatrix} W_{N-1} & W_{N-1} \\ W_{N-1} & -W_{N-1} \end{bmatrix}$$

For example, for embodiments in which the STF overlay sequence may have a length of ten bits, the Walsh set used may be $W_8$. From that a larger matrix is constructed and denoted as $Z_{8\times10}$, which is an eight by ten matrix that is formed by adding two prefix columns. These columns vectors can either be [1 1], [1 −1], [−1 1], or [−1 −1]. Such overlay codes may not be orthogonal over the entire ten STF repetitions, but are orthogonal over the last eight repetitions. As a result, the ACK correlator 1022, 1042 may ignore the first two STF repetitions, for the purposes of detection of the ACK, and use the final eight symbols. This provides two repetitions of the STF to settle automatic gain control in the receiving device.

According to some embodiments, assigning the overlay codewords may be based on network setup. One option is to randomly assign the codewords to different devices, or to assign them randomly to different BSS's. In several embodiments, overlay codewords may be assigned by assigning different overlay codewords to each BSS that is overlapping or adjacent to another BSS. In such embodiments, the receiving devices may only have to check for two STF sequences in their BSS, since the other devices in other BSS's will use a different codeword.

Figure 1B:
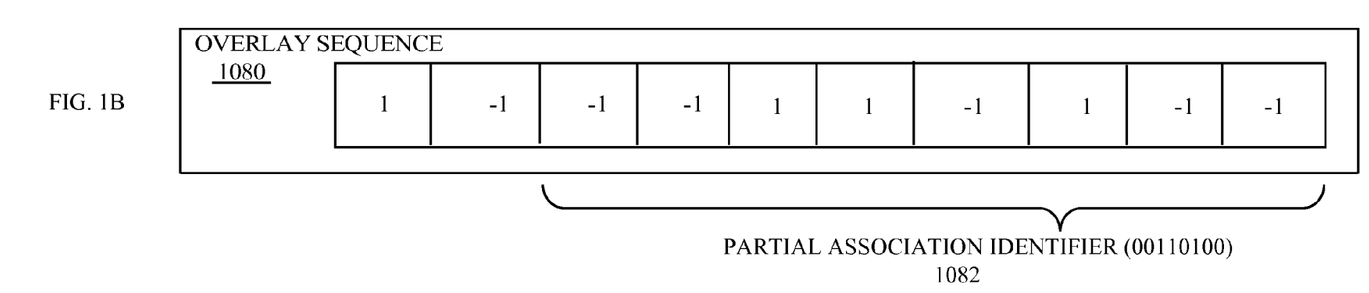
FIG. 1B depicts an alternative embodiment of an overlay sequence to overlay a pattern of short training field symbols.
Figure 1C:
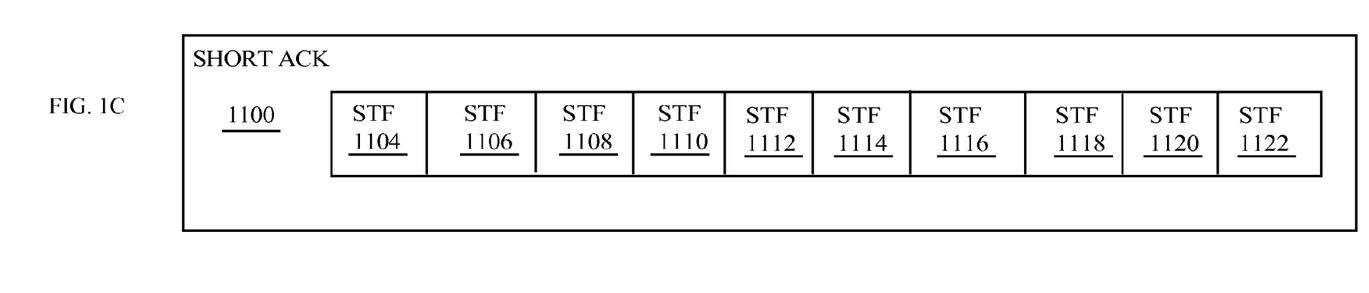
FIG. 1C depicts an embodiment of a truncated packet for acknowledging communications between wireless communication devices based upon the overlay sequence illustrated in FIG. 1B.

In many embodiments, the overlay sequence may comprise a combination of an association identifier (AID). The AID is the value assigned to the communications device, or station (STA), transmitting the transmission by another communications device, or the access point (AP), in the association response frame that established that STA's current association with the AP. FIG. 1B illustrates an embodiment of an overlay sequence 1080 comprising a partial association identifier 1082 comprising (00110100). Note that the overlay sequence begins with a "1" and a "−1", which may be ignored by the receiving communications device for the purposes of determining the partial association identifier 1082. The overlay sequence ends with (−1, −1, 1, 1, −1, 1, −1, −1), which is representative of the codeword (00110100). The overlay sequence 1080 may be overlaid on the STF to form the short acknowledgement 1100. In accordance with the overlay sequence 1080, the short acknowledgement 1100 in such embodiments would comprise an STF 1104, a phase-shifted STF 1106, a phase-shifted STF 1108, a phase-shifted STF 1110, an STF 1112, an STF 1114, a phase-shifted STF 1116, an STF 1118, a phase-shifted STF 1120, and a phase-shifted STF 1122.

In several embodiments, the overlay sequence may comprise a sequence created by adding a portion of the address of the BSS with a portion of the AID of the receiving communications device to create a sequence of eight bits or less.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. Guard tones may be inserted between symbols such as the STF and LTF symbols during transmission to avoid inter-symbol interference (ISI), which might result from multi-path distortion. These guard tones also help the signal conform to a spectral mask. The nulling of the direct component (DC) may be used to simplify direct conversion receiver designs.

In one embodiment, the communications device 1010 optionally comprises a Digital Beam Former (DBF). The DBF transforms information signals into signals to be applied to elements of an antenna array 1024. The antenna array 1024 is an array of individual, separately excitable antenna elements. The signals applied to the elements of the antenna array 1024 cause the antenna array 1024 to radiate, e.g., one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF.

Figure 1D:
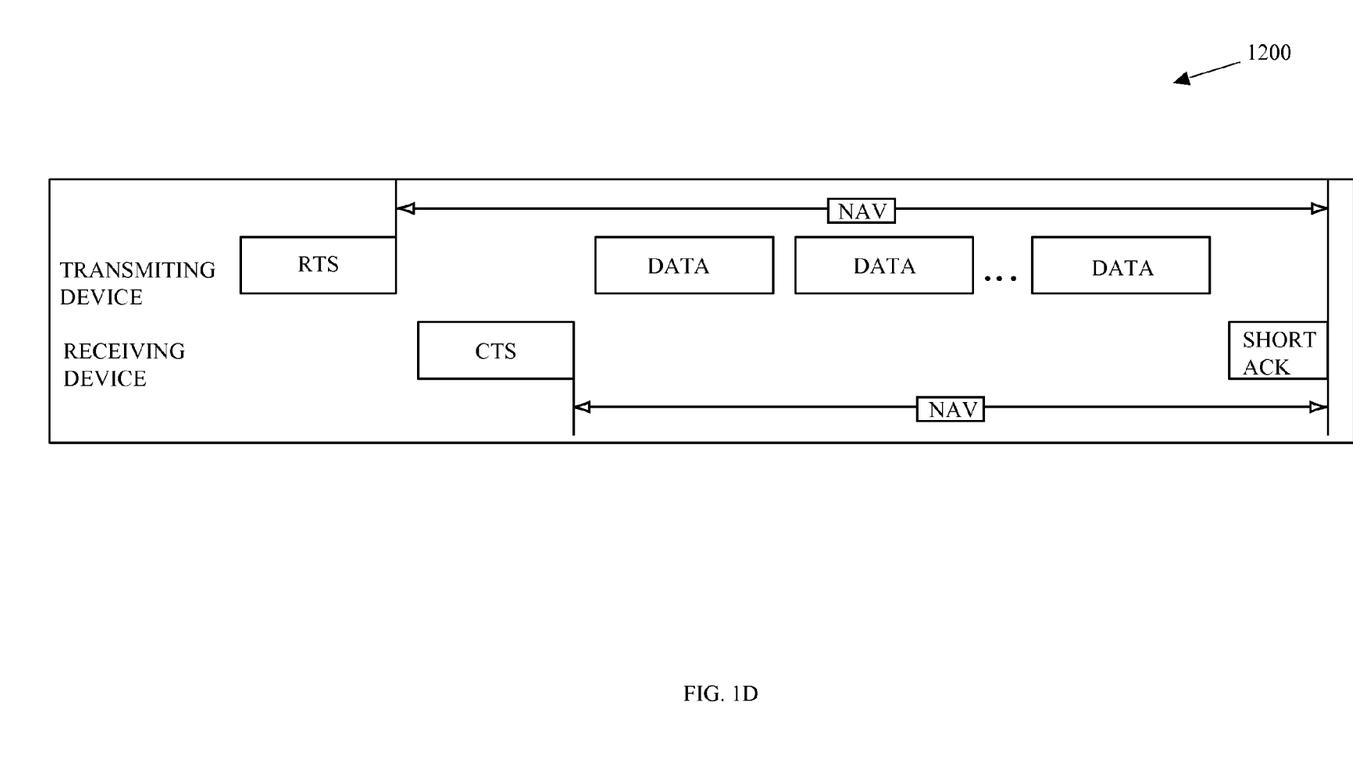
FIG. 1D depicts an embodiment of a protocol with a protection mechanism for acknowledging communications between wireless communication devices.

FIG. 1D illustrates an embodiment 1200 of an operation of one of the functions of a frame. In particular, FIG. 1D illustrates the use on a protected transmission operation (TxOP) for embodiments. Some embodiments may utilize the protected TXOP to inform devices other than the receiver prior to transmission of the frame that the other devices should refrain from transmitting for a particular duration of time. The particular duration of time may be time allocated for transmitting the frame.

As illustrated in FIG. 1D, to establish communications, a transmitting device transmits a control frame comprising a Request To Send (RTS) field that is received by a receiver. The control frame also comprises an address field and a duration field (not shown in FIG. 1D). The address field indicates to which receiver the transmission is intended. The duration field comprises a Network Allocation Vector (NAV) that indicates the duration of time reserved for the transmission. After the RTS signal is sent, but before the data of the transmission is sent, the transmitting device waits to receive a Clear To Send (CTS) signal from the receiver. If the CTS is not received within a short period of time, the intended transmission is temporarily abandoned and a new RTS signal may be sent later. Once the CTS signal is received in response to the RTS, the transmitting device sends the data during the duration of the NAV, as shown in FIG. 1D. If the data is successfully received, the MAC sublayer logic of the receiving device indicates to the physical layer logic of the receiving device that a short acknowledgement should be transmitted and the physical layer logic transmits a short acknowledgment (short ACK) signal to the transmitter. If an ACK signal is not received, the MAC sublayer logic of the receiver may immediately schedule a retransmission.

Figure 2:
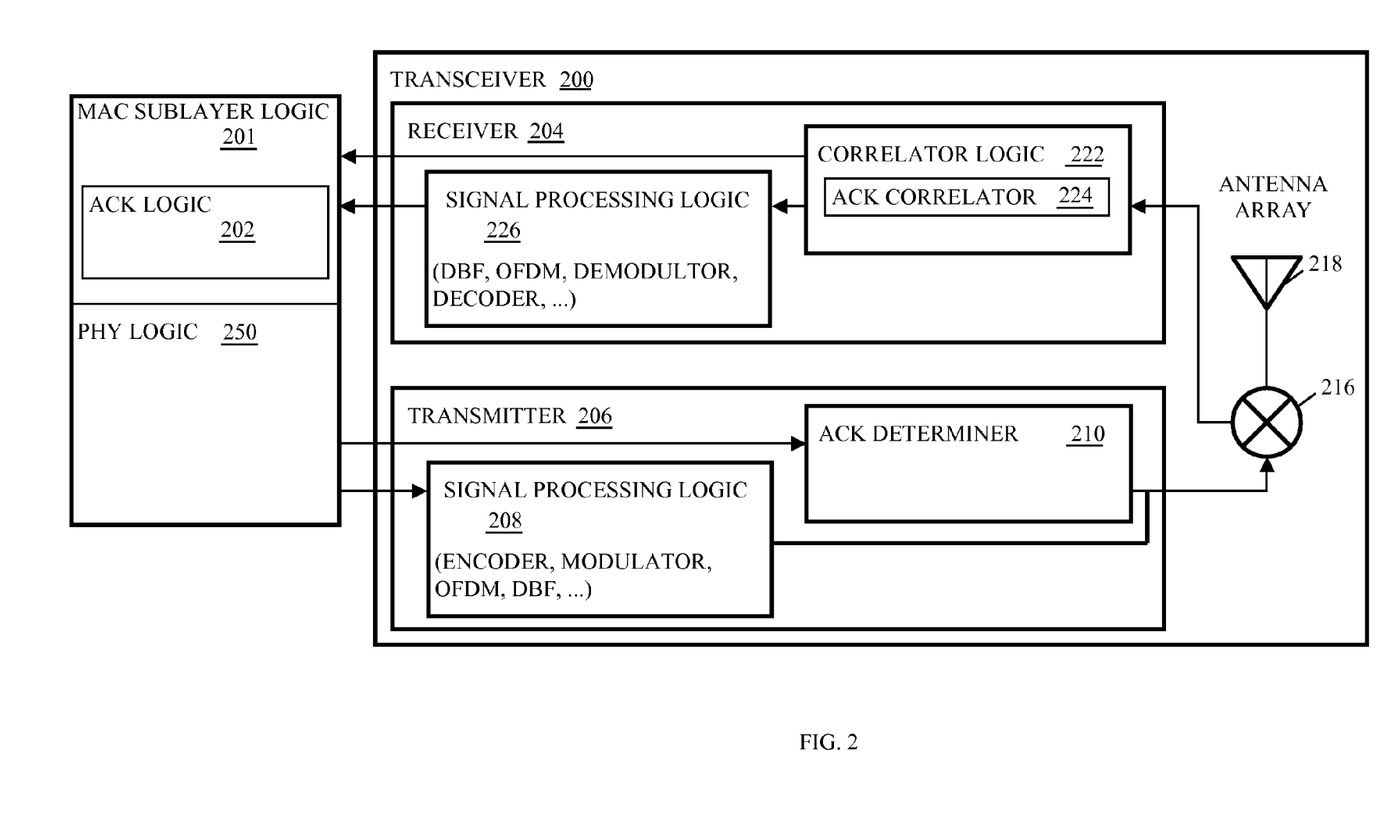
FIG. 2 depicts an embodiment of an apparatus to generate and transmit a short acknowledgement communication in a wireless network.

FIG. 2 illustrates an embodiment of an apparatus to transmit a short acknowledgement communication in a wireless network. The apparatus comprises a transceiver 200 coupled with medium access control (MAC) sublayer logic 201 and physical layer (PHY) logic 250. In general, the MAC sublayer logic 201 may generate a MAC protocol data unit (MPDU) and the PHY logic 250 may generate a PHY protocol data unit (PPDU) with one or more MPDUs to transmit via transceiver 200. In the present embodiment, the MAC sublayer logic 201 may comprise acknowledgement (ACK) logic 202 to transmit an indication to the transceiver 200 to transmit a short acknowledgement. For instance, MAC sublayer logic 201 may determine that a transmission has been successfully received from a communications device and may instruct the physical layer logic of the transceiver 200 to transmit a short acknowledgement to the communications device to acknowledge receipt of the transmission. The indication of the short acknowledgement may be an indication to transmit a truncated packet that comprises the preamble or a portion of the preamble in lieu of transmitting a packet that comprises a preamble and a data payload.

The transceiver 200 comprises a receiver 204 and a transmitter 206. The transmitter 206 may comprise signal processing logic 206 and an acknowledgement determiner 210. The signal processing logic 208 comprises circuitry for processing packets such as a physical layer protocol data unit (PPDU) for transmission via the antenna array 218. The signal processing logic 206 may comprise one or more of an encoder, a modulator, an orthogonal frequency division multiplexer (OFDM), a digital beam former (DBF) and/or other signal processing units. The encoder may receive data destined for transmission from the MAC sublayer logic 202. The modulator may receive data from the encoder to transform each block of binary data received from encoder into a unique continuous-time waveform that can be transmitted by an antenna upon up-conversion and amplification. The output of modulator may be fed to an OFDM to impress the modulated data from modulator onto a plurality of orthogonal sub-carriers. And the output of the OFDM may be fed to the DBF to use digital signal processing algorithms that operate on the signals received by, and transmitted from, an array of antenna elements to steer a plurality of spatial channels independently to maximize the signal power transmitted to and received from each of a plurality of user terminals.

The acknowledgement determiner 210 may couple with the MAC sublayer logic 201 to receive an indication to transmit a short acknowledgement. In response to the indication, the acknowledgement determiner 210 may determine the short acknowledgment, wherein the short acknowledgement comprises a truncated packet with a repeating pattern of symbols and the repeating pattern of symbols comprises at least one phase shift between symbols of the repeating pattern of symbols to identify the truncated packet as the short acknowledgement. For instance, the acknowledgement determiner 210 may comprise logic to select a truncated packet to output and may transmit the truncated packet as the short acknowledgement to the antenna array 218 for transmission to a receiving device.

In some embodiments, the acknowledgement determiner 210 may comprise logic to select a truncated packet from a set of more than one truncated packets to transmit to a receiving device. For example, the acknowledgement determiner 210 may comprise a truncated packet for each communications device that is associated with the transceiver 200. These truncated packets may be built into the acknowledgement determiner 210, or accessible to the acknowledgement determiner 210 by a known means.

In such embodiments, the acknowledgement determiner 210 may select the truncated packet by selecting an output such as by providing a selection input to a multiplexer or the like. For instance, the acknowledgement determiner 210 may select the truncated packet to transmit from a set of truncated packets based upon an association between the truncated packet and an address associated with the receiving device. In some embodiments, the acknowledgement determiner 210 may select the truncated packet with at least part of a medium access control address of the receiving device. In some embodiments, the acknowledgement determiner 210 may select the truncated packet with at least part of a basic service set address associated with the receiving device. And, in some embodiments, the acknowledgement determiner 210 may select the truncated packet associated with the receiving device.

In further embodiments, the acknowledgement determiner 210 may generate a truncated packet to transmit to a receiving device. In some embodiments, the acknowledgement determiner 210 may generate the truncated packet to transmit based upon an overlay sequence. In some embodiments, the acknowledgement determiner 210 may generate the truncated packet to transmit based upon an overlay sequence comprising phase shifts indicative of a medium access control address of the receiving device. And, in some embodiments, the acknowledgement determiner 210 may generate the truncated packet to transmit based upon an overlay sequence comprising phase shifts indicative of a basic service set address associated with the receiving device.

In other embodiments, the acknowledgement determiner 210 may generate a truncated packet to transmit to a receiving device based upon receipt of a preamble or a partial preamble received from a data unit builder.

In many embodiments, the acknowledgement determiner 210 may couple with the MAC sublayer logic 201 in parallel with the signal processing logic 208. In several embodiments, the acknowledgement determiner 210 may couple with the antenna array 218 in parallel with the signal processing logic 208. In other embodiments, the acknowledgement determiner 210 may couple with the antenna array 218 in series with the signal processing logic 208. In further embodiments, the acknowledgement determiner 210 may couple with the antenna array 218 in series with at least a portion of the signal processing logic 208.

The transceiver 200 may also comprise diplexers 216 connected to antenna array 218. Thus, in this embodiment, a single antenna array is used for both transmission and reception. When transmitting, the signal passes through diplexers 216 and drives the antenna with the up-converted information-bearing signal. During transmission, the diplexers 216 prevent the signals to be transmitted from entering receiver 204. When receiving, information bearing signals received by the antenna array pass through diplexers 216 to deliver the signal from the antenna array to receiver 204. The diplexers 216 then prevent the received signals from entering transmitter 206. Thus, diplexers 216 operate as switches to alternately connect the antenna array elements to the receiver 204 and the transmitter 206.

Antenna array 218 radiates the information bearing signals into a time-varying, spatial distribution of electromagnetic energy that can be received by an antenna of a receiver. The receiver can then extract the information of the received signal. An array of antenna elements can produce multiple spatial channels that can be steered to optimize system performance. Reciprocally, multiple spatial channels in the radiation pattern at a receive antenna can be separated into different spatial channels. Thus, a radiation pattern of antenna array 218 may be highly selective. The antenna array 218 may be implemented using existing printed circuit board metallization technology. Microstrips, striplines, slotlines, and patches, for example, are all candidates for the antenna array 218.

The transceiver 200 may comprise a receiver 204 for receiving, demodulating, and decoding information bearing signals. The receiver 204 may comprise a physical layer logic including correlator logic 222 and signal processing logic 226. The correlator logic 222 may correlate data received with preamble symbols such as short training sequences and long training sequences. The correlator logic 222 may also comprise acknowledgement (ACK) logic 224 to compare the received data with known short acknowledgements. For instance, the ACK logic 224 may compare the received data with a known truncated packet for a short acknowledgement for one or more receivers associated with the transceiver 200. In one embodiment, the ACK logic 224 may compare the received data with a known truncated packet of a receiving device from which the ACK logic 224 expects to receive an acknowledgement. The correlator logic 222 may then output an indication of receipt of the short acknowledgement to the MAC sublayer logic 201. In further embodiments, the correlator logic 222 may compare phase shifts associated with the received signal against phase shifts for associated stations. In several embodiments, the correlator logic 222 may compare the overlay sequence or the codeword associated with a received signal against the overlay sequence or the codeword associated with an associated station.

In some embodiments, the correlator logic 222 may couple in series with the signal processing logic 226 and the antenna array 218. In further embodiments, the correlator logic 222 may couple in parallel with the signal processing logic 226. In other embodiments, the correlator logic 222 may operate partially in parallel with the signal processing logic 226.

In the present embodiment, ACK correlator 224 may be implemented at a point in the signal processing that is after the analog to digital conversion of the received signal. In alternative embodiments, the ACK correlator 224 may be implemented at a point during or after the signal processing such as after the DBF, after the OFDM, after the demodulator, or after the decoder of the signal processing logic 226.

In some embodiments, the signal processing logic 226 may comprise one or more of a DBF, an OFDM, a demodulator and a decoder. The received signals are fed from antenna elements 218 to a DBF. The DBF transforms N antenna signals into L information signals. The output of the DBF is fed to the OFDM. The OFDM extracts signal information from the plurality of subcarriers onto which information-bearing signals are modulated. The demodulator demodulates the received signal. And, the decoder decodes the received data from the demodulator and transmits the decoded information, the MPDU, to the MAC sublayer logic 201.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), cache, buffers, registers, a reference oscillator, filtering circuitry, synchronization circuitry, possibly multiple frequency conversion stages and multiple amplification stages, etc. Further, some of the functions shown in FIG. 2 may be integrated. For example, digital beam forming may be integrated with orthogonal frequency division multiplexing. The DRAM, cache, buffers, and registers may couple with any component for storing and manipulating data to accomplish data processing discussed herein.

Figure 3:
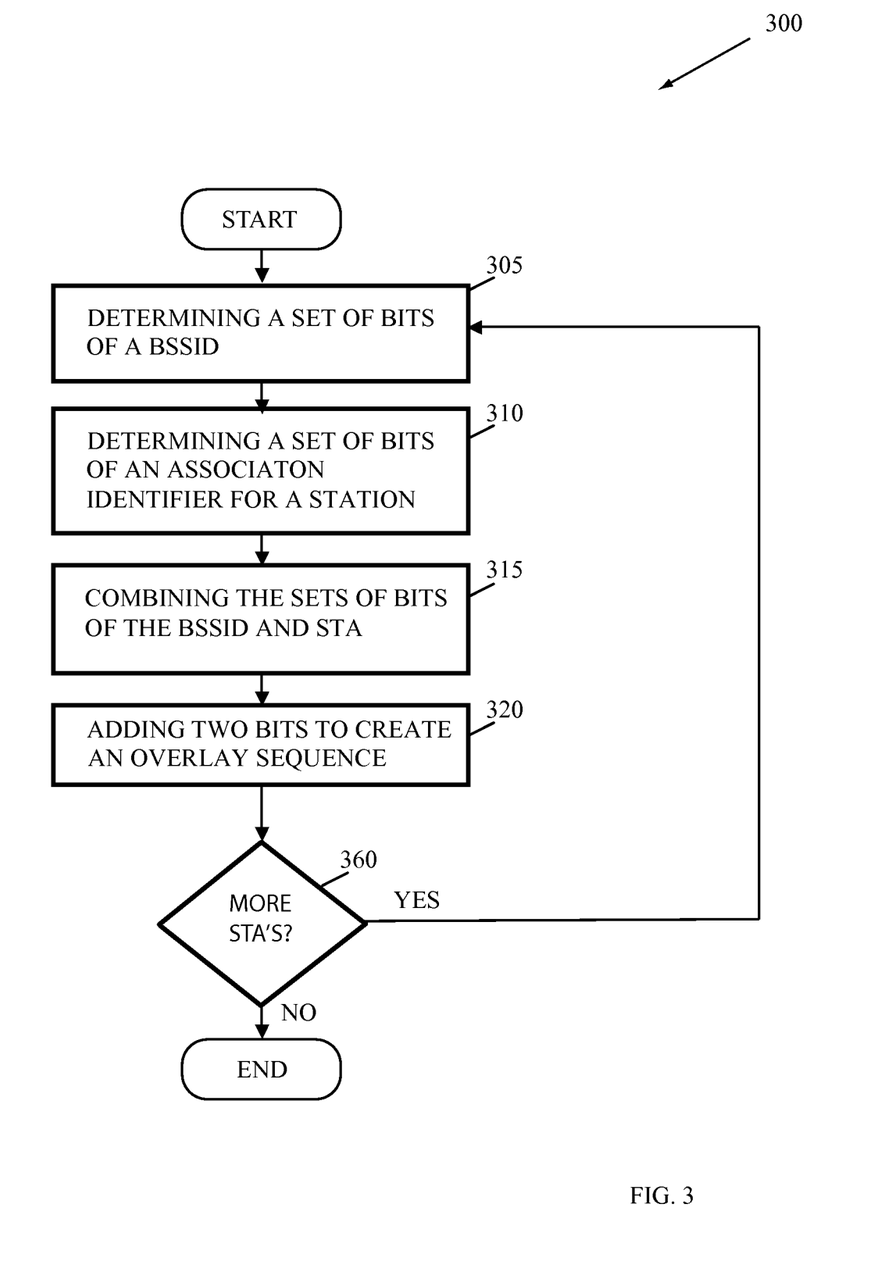
FIG. 3 depicts an embodiment of a flowchart to generate an overlay sequence such as the overlay sequence illustrated in FIG. 1B.

FIG. 3 depicts an embodiment of a flowchart 300 to generate an overlay sequence such as the overlay sequence illustrated in FIG. 1B. The flowchart 300 begins with determining a set of bits of a base service set identifier (BSSID) (element 305). The MAC sublayer logic may interact with a communications device referred to herein as a station (STA), with an association frame and assign a unique codeword that may be used to generate an overlay sequence to create a truncated packet for use as a short acknowledgement. In some embodiments, the unique codeword for the STA may be based upon the BSSID. The MAC sublayer logic may also determine a set of bits of the association identifier (AID) of the STA (element 310) for creating the codeword for the STA. For example, the set of bits of the BSSID may be a set of all the bits of the BSSID or a set of less than all of the bits of the BSSID. Similarly, the set of bits of the AID may be a set of all the bits of the AID or a set of less than all of the bits of the AID.

In several embodiments, the MAC sublayer logic may combine the sets of bits of the BSSID and of the AID to form the unique codeword for the STA (element 315). For instance, the MAC sublayer logic may concatenate the sets of bits, hash the sets of bits, encode the sets of bits, or perform another process on the sets of bits to create a codeword that may be unique with respect to the set of stations associated the basic service set and may also be unique with respect to nearby stations associated with an adjacent basic service set.

In many embodiments, the MAC sublayer logic may add, e.g., two bits to the beginning of the codeword to create an overlay sequence. The overlay sequence may then be used to create a short acknowledgement by applying phase shifts to symbols of a preamble or partial preamble such as to the ten symbols of an STF. Thereafter, the truncated packet or the overlay sequence may be stored in a location such as memory that is accessible by the ACK determiner and the ACK correlator of a physical layer logic so that the physical layer logic may transmit and receive the short acknowledgement in lieu of a full packet including the acknowledgement in the payload of a PPDU.

If more STAs associate with the MAC sublayer logic, the MAC sublayer logic may begin the process of flowchart 300 again at element 305. Otherwise, the process of flowchart 300 may end.

Figure 4A:
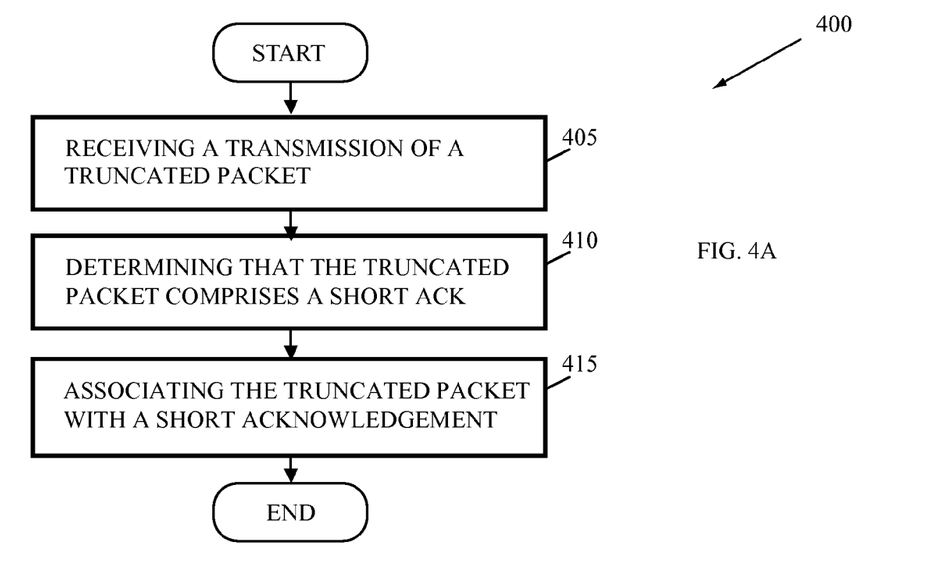
FIGS. 4A-B depict embodiments of flowcharts to transmit and receive communications with a transmitter and a receiver as illustrated in FIG. 2.
Figure 4B:
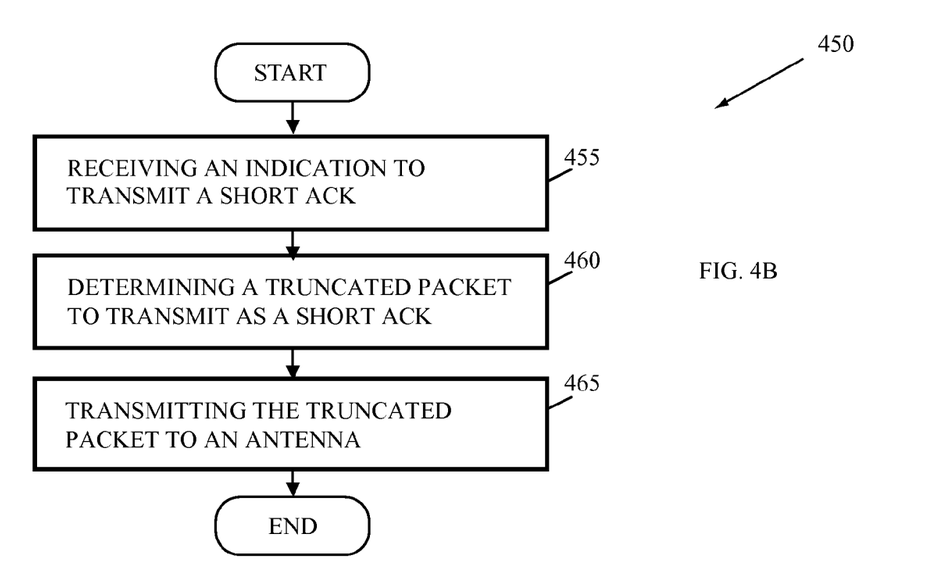

FIGS. 4A-B depict embodiments of flowcharts 400 and 450 to transmit and receive communications with a transmitter and a receiver as illustrated in FIG. 2. Referring to FIG. 4A, the flowchart 400 begins with a receiver such as receiver 204 receiving a transmission of truncated packet (element 405). The receiver may correlate the truncated packet with a known truncated packet via an ACK correlator to determine if the truncated packet is a short acknowledgement configured for receipt by the receiver (element 410). More specifically, the receiver may compare the truncated packet or at least phase shifts between the symbols of the truncated packet against a known pattern of phase shifts for an associated communications device. Thereafter, the receiver may associate the truncated packet with a short acknowledgement with a particular communications device (element 415) and transmit an indication of the short acknowledgement and the association with the particular communications device to the MAC sublayer logic.

Referring to FIG. 4B, the flowchart 450 begins with a physical layer logic such as physical layer logic 1021 in FIG. 1 receiving an indication from a MAC sublayer logic such as MAC sublayer logic 1018 to transmit a short acknowledgement (element 455). The physical layer logic may determine a truncated packet to transmit by selecting the truncated packet to output to an antenna or by generating the truncated packet based upon an overlay sequence and a set of repeating symbols such as the repeating symbols of an STF (element 460). For instance, the MAC sublayer logic may indicate the transmission of a short ACK by transmitting an index number to the ACK determiner of a transmitter.

In some embodiments, the ACK determiner may use the index to select a truncated packet from a number of indexed truncated packets. In further embodiments, the ACK determiner may use the index number as a selection signal to select the truncated packet via, e.g., a multiplexor. The physical layer logic may then transmit the truncated packet to an antenna for transmission (element 465). In other embodiments, the ACK determiner may use the index number to generate a short acknowledgement based upon an overlay sequence or codeword associated with the index number.

Another embodiment is implemented as a program product for implementing systems and methods described with reference to FIGS. 1-4. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

It will be apparent to those skilled in the art having the benefit of this disclosure that the present disclosure contemplates a new, short acknowledgement. It is understood that the form of the embodiments shown and described in the detailed description and the drawings are to be taken merely as examples. It is intended that the following claims be interpreted broadly to embrace all variations of the example embodiments disclosed.

What is claimed is:

1. A method comprising:
 receiving, by an acknowledgement determiner, an indication to transmit a short acknowledgement;
 determining, by the acknowledgement determiner, the short acknowledgment, wherein the short acknowledgement comprises a truncated packet with a repeating pattern of symbols, the repeating pattern of symbols comprising at least one phase shift between symbols of the repeating pattern of symbols to identify the truncated packet as the short acknowledgement, wherein the at least one phase shift between symbols indicates bits of an association identifier (AID) of a device,
 wherein the at least one phase shift comprises a 90 degree phase shift between the symbols,
 wherein the at least one phase shift between the symbols is orthogonal over the last eight repetitions of a short training field; and
 transmitting, by the acknowledgement determiner, the short acknowledgement to an antenna for transmission.

2. The method of claim 1, wherein determining, by the acknowledgement determiner, the short acknowledgement comprises selecting the truncated packet to transmit.

3. The method of claim 2, wherein selecting the truncated packet to transmit comprises selecting the truncated packet, wherein the truncated packet comprises a pattern of phase shifts between the symbols indicative of the AID and a service set identifier.

4. The method of claim 2, wherein selecting the truncated packet to transmit comprises selecting the truncated packet, wherein the truncated packet comprises a pattern of phase shifts between symbols of a short training sequence.

5. The method of claim 2, wherein selecting the truncated packet to transmit comprises selecting the truncated packet, wherein the truncated packet comprises a phase shift between symbols of a long training sequence.

6. The method of claim 1, wherein determining, by the acknowledgement generator, the short acknowledgement, wherein the at least one phase shift between symbols indicates bits of an association identifier (AID) of a device comprises determining the short acknowledgement, wherein the at least one phase shift between symbols indicates bits of a randomly assigned sequence for a basic service set (BSS).

7. The method of claim 1, wherein generating the truncated packet to transmit comprises generating the truncated packet to transmit with an overlay sequence, the overlay sequence to identify phase shifts between the symbols of the repeating pattern.

8. The method of claim 1, wherein generating the truncated packet to transmit comprises generating an overlay sequence, wherein generating the overlay sequence comprises generating the overlay sequence with one or more bits from the media access control address of the station and one or more bits from the basic service set identification.

9. The method of claim 1, wherein generating the truncated packet to transmit comprises generating an overlay sequence comprising one or more bits from the media access control address of the station and one or more bits from the basic service set identification.

10. The method of claim 1, wherein generating the truncated packet to transmit comprises generating an overlay sequence that does not phase shift the first short training sequence symbol and does not phase shift the second short training sequence symbol.

11. A device comprising:
one or more integrated circuit chips comprising circuitry to process packets for transmission via an antenna, wherein the one or more integrated circuit chips comprise:
physical layer (PHY) logic, the PHY logic comprising:
logic to receive an indication to transmit a short acknowledgement;
logic to determine the short acknowledgment, wherein the short acknowledgement comprises a truncated packet with a repeating pattern of symbols, the repeating pattern of symbols comprising at least one phase shift between symbols of the repeating pattern of symbols to identify the truncated packet as the short acknowledgement, wherein the at least one phase shift between symbols indicates bits of an association identifier (AID),
wherein the at least one phase shift comprises a 90 degree phase shift between the symbols,
wherein the at least one phase shift between the symbols is orthogonal over the last eight repetitions of a short training field; and
logic to transmit the short acknowledgement to the antenna for transmission to a receiving device.

12. The device of claim 11, wherein the PHY logic comprises logic to select the truncated packet to transmit.

13. The device of claim 11, wherein the PHY logic comprises logic to select the truncated packet to transmit from a set of truncated packets based upon an association between the truncated packet and an address associated with the receiving device.

14. The device of claim 11, wherein the PHY logic comprises logic to select the truncated packet to transmit, wherein the truncated packet comprises at least part of a medium access control address of the receiving device.

15. The device of claim 11, wherein the PHY logic comprises logic to select the truncated packet to transmit, wherein the truncated packet comprises at least part of a basic service set address associated with the receiving device.

16. The device of claim 11, wherein the PHY logic comprises logic to generate the truncated packet to transmit.

17. The device of claim 11, wherein the PHY logic comprises logic to generate the truncated packet to transmit based upon an overlay sequence.

18. The device of claim 11, wherein the PHY logic comprises logic to generate the truncated packet to transmit based upon an overlay sequence comprising phase shifts indicative of a medium access control address of the receiving device.

19. A method comprising:
receiving, by correlation logic, a transmission comprising a short acknowledgement; and
comparing, by the correlation logic, the short acknowledgment with a known short acknowledgement to determine that the transmission comprises the short acknowledgement, wherein comparing the short acknowledgement with a known short acknowledgement comprises comparing at least one phase shift between symbols of a repeating pattern of symbols in the short acknowledgement with at least one phase shift between symbols of a repeating pattern of symbols in the known short acknowledgement to identify the truncated packet as the short acknowledgement and to identify an association identifier (AID) of a device, wherein the at least one phase shift between symbols indicates bits of the AID,
wherein the at least one phase shift comprises a 90 degree phase shift between the symbols,
wherein the at least one phase shift between the symbols is orthogonal over the last eight repetitions of a short training field.

20. The method of claim 19, further comprising receiving, by an antenna coupled with the correlation logic, the transmission comprising the short acknowledgement.

21. The method of claim 19, further comprising transmitting, by the correlation logic, an indication of the short acknowledgement to a medium access control sublayer logic.

22. The method of claim 19, wherein comparing, by the correlation logic, the short acknowledgment with the known short acknowledgement comprises comparing the truncated packet with a known truncated packet, wherein the known truncated packet comprises a repeating pattern of symbols with phase shifts between symbols, the phase shifts between the symbols being indicative of an address of a receiving device comprising the correlation logic.

23. A device comprising:
one or more integrated circuit chips comprising circuitry to process packets received via an antenna, wherein the one or more integrated circuit chips comprise:
physical layer (PHY) logic, the PHY logic comprising:
logic to receive a transmission comprising a short acknowledgement; and
logic to compare the short acknowledgment with a known short acknowledgement to determine that the transmission comprises the short acknowledgement, wherein comparison of the short acknowledgement with the known short acknowledgement comprises comparison of at least one phase shift between symbols of a repeating pattern of symbols in the short acknowledgement with at least one phase shift between symbols of a repeating pattern of symbols in the known short acknowledgement to identify the truncated packet as the short acknowledgement and to identify an association identifier (AID) of a device, wherein the at least one phase shift between symbols indicates bits of the AID,
wherein the at least one phase shift comprises a 90 degree phase shift between the symbols,
wherein the at least one phase shift between the symbols is orthogonal over the last eight repetitions of a short training field.

24. The device of claim 23, further comprising transmitting, by the PHY logic, an indication of the short acknowledgement to a medium access sublayer logic.

25. The device of claim 23, wherein the PHY logic comprises logic to compare the truncated packet with a known truncated packet, wherein the known truncated packet comprises a repeating pattern of symbols with phase shifts between symbols, the phase shifts between the symbols being indicative of an address of the device.

\* \* \* \* \*